No. 744,461.

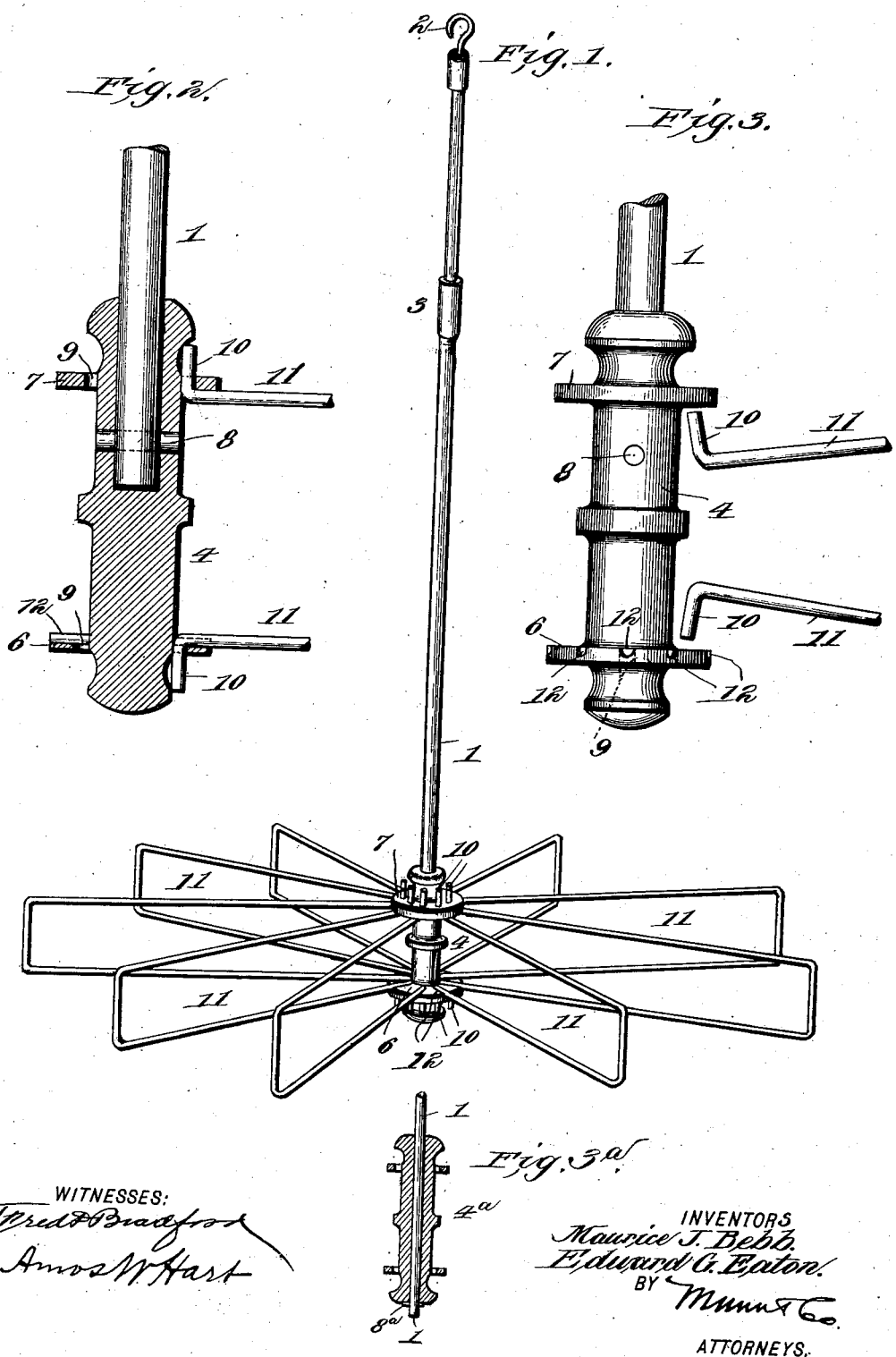

Patented November 17, 1903.

UNITED STATES PATENT OFFICE.

MAURICE J. BEBB, OF XENIA, AND EDWARD GEORGE EATON, OF ATHENS, OHIO.

DEVICE FOR EXHIBITING GOODS.

SPECIFICATION forming part of Letters Patent No. 744,461, dated November 17, 1903.

Application filed January 3, 1903. Serial No. 137,654. (No model.)

*To all whom it may concern:*

Be it known that we, MAURICE J. BEBB, residing at Xenia, in the county of Greene, and EDWARD GEORGE EATON, residing at Athens, in the county of Athens, State of Ohio, citizens of the United States, have made certain new and useful Improvements in Devices for Exhibiting Goods, of which the following is a specification.

Our invention is designed for suspending and displaying goods in stores or shops, and is particularly useful for displaying handkerchiefs, ribbons, hosiery, underwear, belts, neckwear, laces, shirt-waists, towels, &c.

The details of construction, arrangement, and operation of parts are as hereinafter described, reference being had to the accompanying drawings, in which—

Figure 1 is a perspective view of the principal form or embodiment of our invention. Fig. 2 is an enlarged vertical section of the lower portion of the device shown in Fig. 1. Fig. 3 is an enlarged side view of the parts shown in Fig. 1, the horizontal spring-arms being shown detached. Fig. $3^a$ shows a modification in the suspending device.

1 designates a rod provided at its upper end with a swiveled hook 2, by which it is adapted for suspension from the ceiling or any other fixed overhead support. The attachment may be made directly to a screw-eye or by a cord or other device. The said rod may be made in sections and the same connected by a nut or turnbuckle 3. We propose, however, to substitute any other connecting device which may be preferred. On the lower end of the rod 1 is secured a hub 4, (see Figs. 2 and 3,) the same having two lateral flanges 6 and 7 and being provided with a central socket or bore to receive the rod 1, to which it is fastened by means of a cross-pin 8. The rod 1 may, however, pass entirely through a hub $4^a$, (see Fig. $3^a$,) and provided with a cross-pin $8^a$ below said hub, which arrangement permits rotation of the display-rack proper. Both the flanges 6 and 7 of the hub 4 or $4^a$ are provided with vertical coincident holes or openings 9 for the purpose of receiving the bent ends 10 of horizontal arms 11. As shown in Fig. 1, the said arms are practically U-shaped and extended horizontally as well as radially from the hub 4. Their ends 10 are bent at right angles and in opposite directions vertically. The arms 11 being made of spring material, it is apparent that their inner ends may be pressed toward each other, as shown in Fig. 3, for the purpose of attaching them to the flanges 6 and 7 or detaching them therefrom, as the case may be. When the ends 10 are passed through the coincident holes 9, as shown in in Figs. 1 and 2, the resiliency of the arms holds them thus engaged or locked, whereby they are held extended horizontally. In order to hold them in radial position—that is to say, to prevent their rotation—I provide grooves 12 in the lower flange 6, said grooves being radial and coinciding with the openings 9. The grooves are of such depth as to receive about half the thickness of the lower portion of the arms 11, as illustrated in Fig. 2. By this means when the arms 11 have been duly set in place, as indicated, the grooves 12 serve as lateral stops or shoulders, preventing any rotary movement of the arms, so that the whole series are held immovable and equidistant. In other words, the arms are thus prevented from falling together or collapsing, and the goods are thereby displayed to the best advantage. This construction and combination of parts in no wise hinders the convenient and speedy removal of any particular arm or series of arms as conditions may require.

Having thus described our invention, what we claim as new, and desire to secure by Letters Patent, is—

1. The improved device for displaying goods, consisting of a vertical suspending-rod, a hub having a central longitudinal bore to receive said rod and provided with horizontal flanges having coincident vertical openings, and the lower one provided with radial grooves which are coincident with the openings therein, and a series of U-shaped spring-arms having their ends bent vertically in opposite directions, and adapted to engage the openings and grooves in the said flanges, whereby they are held detachably yet immovably while in use, substantially as shown and described.

2. As an improved article of manufacture, the hub adapted for use as the central part of a goods-display device, the same consisting of a cylindrical elongated body having an integral, radial, circumferential flange near each end, the two flanges being provided with coincident vertical holes and the lower one having radial grooves leading from each hole, as and for the purpose specified.

MAURICE J. BEBB.
EDWARD GEORGE EATON.

Witnesses as to signature of Maurice Jehu Bebb:
FRANK H. DEAN,
I. K. WARNER.

Witnesses as to signature of Edward G. Eaton:
L. A. KOONS,
H. R. RAMSEY.